UNITED STATES PATENT OFFICE.

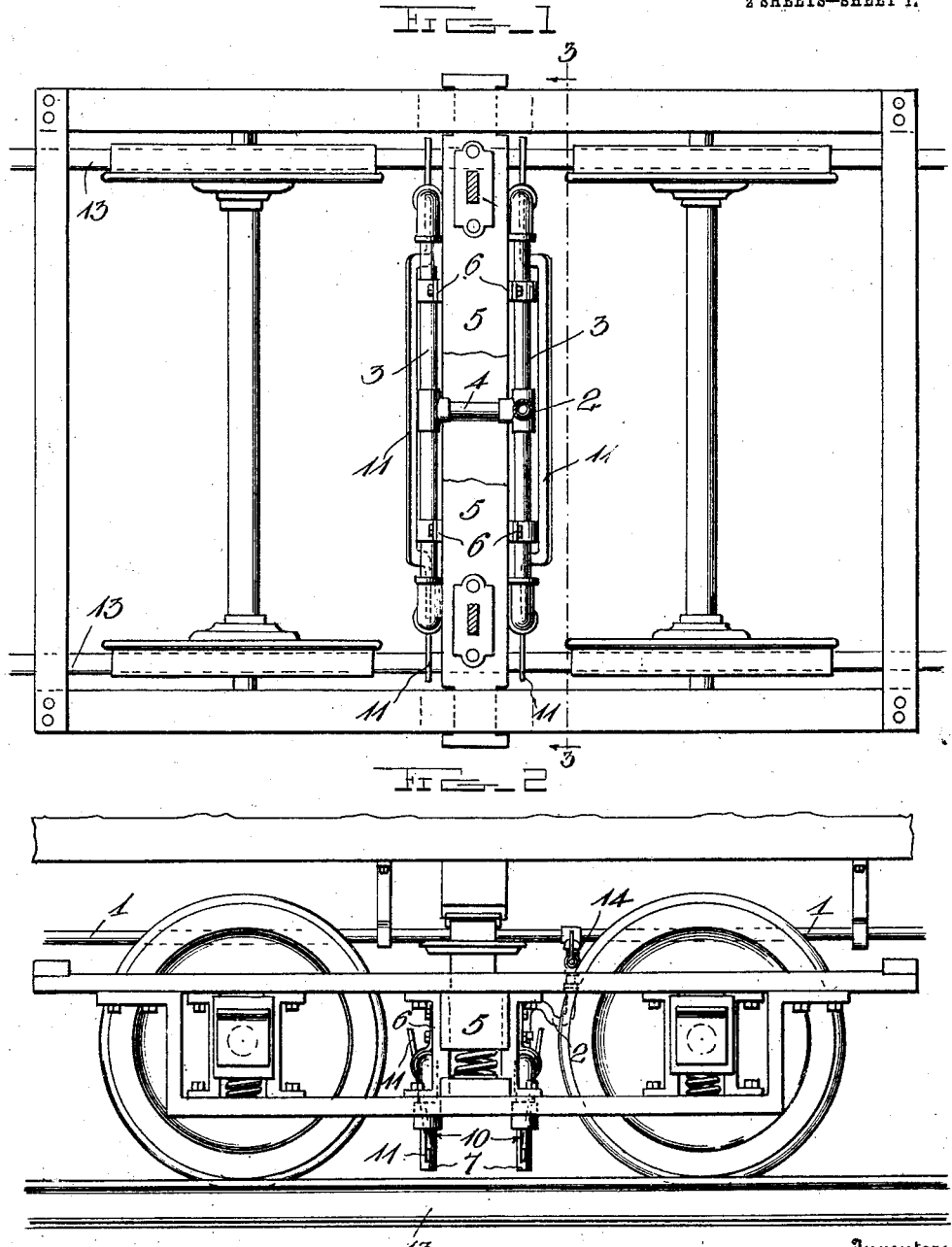

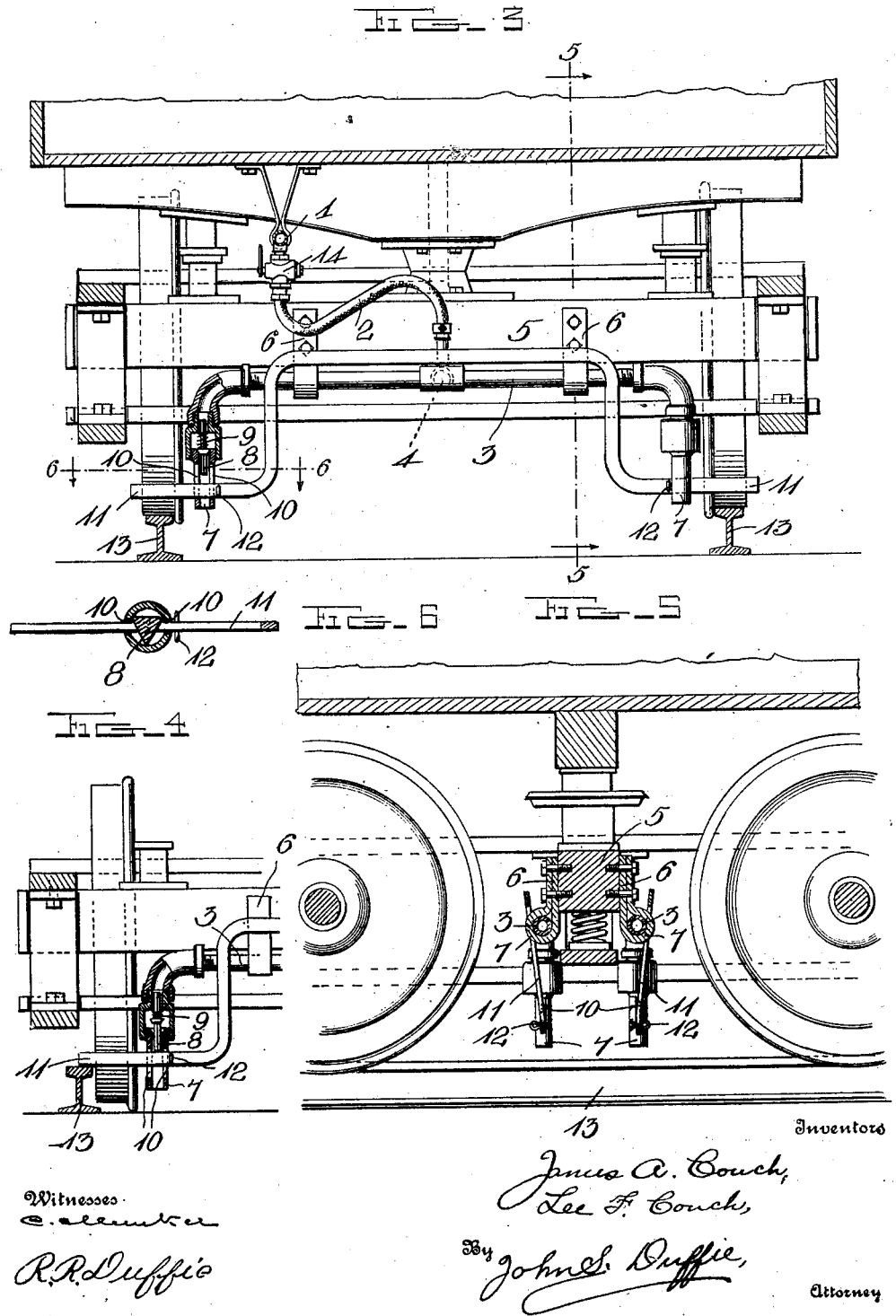

JAMES A. COUCH AND LEE F. COUCH, OF NASHVILLE, ARKANSAS.

AUTOMATIC AIR-BRAKE APPLIANCE.

No. 924,742.  Specification of Letters Patent.  Patented June 15, 1909.

Application filed September 8, 1908. Serial No. 452,137.

*To all whom it may concern:*

Be it known that we, JAMES A. COUCH and LEE F. COUCH, citizens of the United States, residing at Nashville, in the county of Howard and State of Arkansas, have invented certain new and useful Improvements in Automatic Air-Brake Appliances, of which the following is a specification.

Our invention has relation to new and useful improvements in the mode of automatically applying air brakes, to the wheels of a truck, in the event of the derailment of one or more of said wheels.

It has been claimed in previous patents that a superior device is created by applying the automatic brake mechanism to that part of the truck which does not respond to pressure, caused by the amount of the load or the number of passengers carried by the car, or by a sudden jar, due to an obstacle on the track, through accident, or so placed with mischievous intent.

In our device we purposely connect the automatic mechanism thereof to the bolster of the truck, so that, should a sudden, overwhelming jar be caused by some impediment in the path of one of the track wheels, then the brakes will be, and ought to be set, that is, if said jar is sufficient to bring the valve actuating lever into contact with one of the track rails. This will also be a preventive, or warning to trainmen, in the overcrowding of passenger trains, which overcrowding has been the cause of disastrous accidents.

The fact that our device is connected to the bolster, will not in any wise, hamper its efficient operation.

Thus the object of our invention is to provide a brake operating mechanism, which will be efficient in operation, simple in construction, strong and durable, and most important of all, automatic in its operation, whenever danger threatens damage or injury to the train or its occupants. Further it is observed that the installation of our mechanism will be comparatively inexpensive.

With the foregoing and other objects in view, the invention consists in the novel construction, combination and arrangements of parts hereinafter more specifically described and illustrated in the accompanying drawings, wherein is shown the preferred embodiment of the invention, but it is to be understood that changes, variations, and modifications can be resorted to which come within the scope of the claims hereunto appended.

In the accompanying drawing, forming a part of this specification:—Figure 1, is a top plan view of a truck, having the improved brake appliance mounted thereon, enough of the bolster broken away to show the construction thereof. Fig. 2, is a side elevation thereof. Fig. 3, is a vertical sectional view of Fig. 1, taken on the line 3—3, thereof. Fig. 4, is a sectional view of a portion of the device, showing one of the truck wheels derailed, and consequently the valve raised from its seat. Fig. 5, is a vertical sectional view of Fig. 3, taken on the line 5—5, thereof. Fig. 6, is a horizontal sectional view of Fig. 3, taken on the line 6—6 thereof, showing the shape of the valve stem in cross section.

Referring more particularly to the drawings our invention is described as follows:—

The train pipe 1, which is connected to the under surfaces of the cars of said train by any substantial means, and which is joined from car to car in the usual manner, has connected thereto at each truck a hose coupling 2, which is in turn connected to one of the pipes 3. Said pipes 3, communicate with each other by means of the connecting pipe 4. These pipes 3, are secured to the bolster 5, by means of the braces 6, said pipes having downwardly turned portions 7, secured or formed thereto.

The downwardly extending portion 7, having the valve 8, firmly held in its seat by means of a spring 9, has the vertically disposed slots 10, cut in the walls thereof. A valve actuating lever 11, each end of which passes through the slots in one of the said downwardly extending portions 7, is bowed upwardly so as to pass any obstruction that may happen to be in its path. This lever may be made of any suitable material, and of desired thickness. Said lever is held against sidewise movement by means of the cotter pins 12, passed through perforations therein.

The operation of our invention is described as follows:—Should one or more wheels of a truck jump the track said valve actuating lever will come in contact with one of the rails 13, forcing the valve stem upwardly, causing the valve to leave its seat against the action of said spring 9. Thus the air will escape from the pressure tanks, throughout the entire train, setting all of the brakes secured to the trucks thereof.

If it is desired to throw out of operation any one of the automatic brake operating mechanisms the cut off 14, may be employed for this purpose.

Our invention is adapted to be used in connection with the well known Westinghouse automatic air-brake, or other train-brake mechanisms in which the brake is applied by the liberation of air in the train-pipe or the admission of air or steam to a brake-cylinder, and may also be applied to systems where the making or breaking of an electric circuit is caused to actuate a brake.

It is observed that by the use of our invention, it is necessary to employ only one pipe coupling 2, at each truck in order that the brake mechanisms may be successfully operated. This is accomplished by the arrangement of pipes 3, and their means of communication, consisting of pipe 4.

As our invention resides mainly in the manner and means of setting the brakes, we have not gone into details in the description of the truck, the particular valve that may be used, or the particular construction or method of brake appliance that may be employed, as these are shown in the drawings for illustrative purposes only, and each may be substituted, respectively, for its equivalent.

Our device as illustrated, though it is shown in its preferred form, is thus represented for illustrative purposes only, and therefore we may claim the right to make such slight changes in the construction and arrangement of the elements thereof, as will not sacrifice any of our patentable rights, and as will not depart from the spirit of our invention.

Having described our invention, what we claim as new and desire to claim by Letters Patent, is:—

1. In a device of the character described the combination with a car provided with power operated brakes, of a brake-setting valve operating mechanism, comprising two parallel pipes, secured to the bolster of the truck of said car, and at right angles to the track rails, said pipes communicating with each other, valve actuating levers, so arranged that they will strike against one of the track-rails, in case of derailment of one or more of the car-wheels, or over-pressure on said bolster, and operate said brake-setting valves, said lever adapted and arranged to slide vertically, means of communication furnished between said parallel pipes and said train pipe, substantially as shown and described.

2. In a device of the character described the combination with a car provided with power operated brakes, of a brake-setting valve operating mechanism, comprising two parallel pipes, secured to the bolster of the truck of said car, and at right angles to the track-rails, said pipes communicating with each other, valve actuating levers, so arranged that they will strike against one of said track-rails, in case of derailment of one or more of the car-wheels, and operate said brake-setting valves, said lever adapted to slide in vertically disposed slots cut in downwardly extending portions of said parallel pipes; means of communication between said parallel pipes and said train-pipe, substantially as shown and described.

3. In a device of the character described the combination with a car provided with power operated brakes, of a brake-setting valve operating mechanism, comprising two parallel pipes, secured to the bolster of the truck of said car, and at right-angles to the track-rails, said pipes communicating with each other, valve actuating levers, downwardly extending portions secured or formed to said pipes at their outer ends, said portions containing valves, the valves held normally in position by springs, vertically disposed slots cut in each of said portions, said valve actuating levers adapted to slide in said vertically disposed slots, and so arranged as to strike against one of the track rails, in case of derailment of one of the car-wheels, and operate said brake-setting valves, one hose coupling leading from each truck to the train-pipe of said car, as means of communication between said parallel pipes and said train-pipe, substantially as shown and described.

In testimony whereof we affix our signatures in presence of two witnesses.

JAMES A. COUCH.
LEE F. COUCH.

Witnesses:
SAM E. LESLIE,
LAURENCE M. DALY.